(12) United States Patent
Karunamoorthy et al.

(10) Patent No.: US 10,713,141 B2
(45) Date of Patent: Jul. 14, 2020

(54) CAPTURING NATIVE APPLICATION CONTENT RENDERING PERFORMANCE

(71) Applicant: eBay Inc., San Jose, CA (US)

(72) Inventors: Elango Karunamoorthy, San Jose, CA (US); Kandakumar Doraisamy, San Jose, CA (US); Jancy Latha Vincent, San Jose, CA (US); Anoop Kumar Koloth, Campbell, CA (US)

(73) Assignee: eBay Inc., San Jose, CA (US)

( * ) Notice: Subject to any disclaimer, the term of this patent is extended or adjusted under 35 U.S.C. 154(b) by 336 days.

(21) Appl. No.: 15/660,162

(22) Filed: Jul. 26, 2017

(65) Prior Publication Data

US 2019/0034312 A1 Jan. 31, 2019

(51) Int. Cl.
*G06F 11/34* (2006.01)
*G06F 11/30* (2006.01)
*G06K 9/00* (2006.01)
*G06K 9/62* (2006.01)

(52) U.S. Cl.
CPC ........ *G06F 11/3419* (2013.01); *G06F 11/302* (2013.01); *G06K 9/00758* (2013.01); *G06K 9/6215* (2013.01)

(58) Field of Classification Search
CPC .............. G06F 11/302; G06F 11/3419; G06K 9/00758; G06K 9/6215
See application file for complete search history.

(56) References Cited

U.S. PATENT DOCUMENTS 8,291,322 B2 * 10/2012 Klappert ............... G06F 3/0346
715/721
2013/0293531 A1 * 11/2013 Cao ...................... H04N 13/122
345/419

OTHER PUBLICATIONS

"Debug Your App |Android Developers", Retrieved from the Internet: URL: <https://developer.android.com/studio/debug/index.html>, Accessed on Aug. 8, 2018, 16 pages.
"Firebug", Retrieved from the Internet: URL: <http://getfirebug.com/>, Accessed on Aug. 7, 2018, 2 pages.
Pingdom, "Website Performance Monitoring Made Easy", Retrieved from the Internet: URL: <https://www.pingdom.com/>, Accessed on Aug. 7, 2018, 3 pages.

(Continued)

*Primary Examiner* — Elias Desta
(74) *Attorney, Agent, or Firm* — Newport IP, LLC

(57) ABSTRACT

A system, method, and computer program product are provided for determining a duration of time required to render a web page or other content displayed by a native application running on a user device. One embodiment captures screenshots of the application's displayed output on a user device as video frames, and determines when the displayed output image content stabilizes. Another embodiment measures the number of service calls from a mobile client machine and the data requested and/or sent in response to such calls to determine native application performance. In another embodiment, a configuration file updates application executables and runs batch content rendering performance tests. Embodiments timestamp and store test results for subsequent visual depiction, evaluation, and analysis by developer teams and/or users. Performance variations due to changes to a native application or content may be routed to a particular application developer or content designer for possible correction and improvement.

20 Claims, 9 Drawing Sheets

(56) References Cited

OTHER PUBLICATIONS

Stackexchange, "Compare Screenshots of Rendered Web Pages", Retrieved from the Internet: URL: <https://sqa.stackexchange.com/questions/2459/compare-screenshots-of-rendered-web-pages>, Aug. 8, 2018, 5 pages.

Wang, "W3C Navigation Timing", Retrieved from the Internet: URL: <https://www.w3.org/TR/navigation-timing/>, Dec. 17, 2012, 16 pages.

Webpagetest, "Test a Website's Performance", Retrieved from the Internet: URL: <https://www.webpagetest.org/>, Accessed on Aug. 7, 2018, 1 page.

* cited by examiner

CAPTURING NATIVE APPLICATION CONTENT RENDERING PERFORMANCE

TECHNICAL FIELD

The present disclosure relates to collecting performance data describing the time required for a particular client machine executing a native application to fully render content in a display.

BACKGROUND

As the use of network-based publication systems and marketplaces such as online commerce services or auction services expands, and the volume of item listings in such applications increases, the speed, ease, and convenience with which product information that is relevant to customers may be retrieved from such marketplaces increases in importance to customers.

BRIEF DESCRIPTION OF DRAWINGS

Some embodiments are illustrated by way of example acid trot limitation in the figures of the accompanying drawings in which.

DETAILED DESCRIPTION

Figure 1:
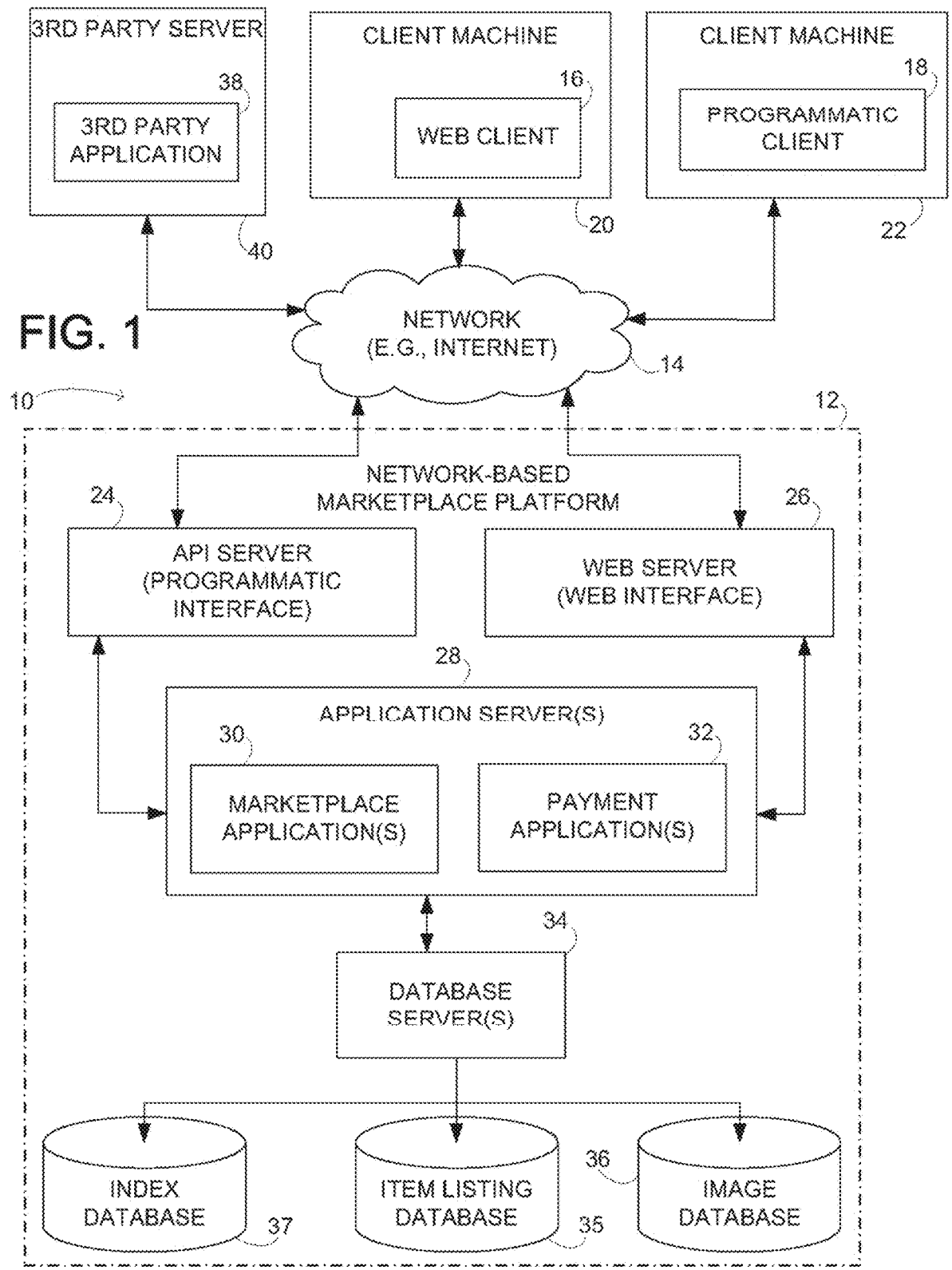
FIG. 1 is a block diagram illustrating a publication system in the example form of a network-based marketplace system.

In the following description, for purposes of explanation, numerous specific details are set forth in order to provide a thorough understanding of some example embodiments. It will be evident, however, to one skilled in the art that the present embodiments may be practiced without these specific details. Examples merely typify possible variations. Unless explicitly stated otherwise, components and functions are optional and may vary in sequence or be combined or subdivided.

Users of networked publication and ecommerce systems often experience difficulty in finding items of interest because the particular client device executing a native application takes too much time to render particular content.

For purposes of this description, "rendering" refers to the process of presenting various components of an image to produce a final displayed graphical output. This problem may be of particular importance to users of mobile devices, which may have limited computational capability. Such users often revise or even abandon item searches when rendering is too slow, which further reduces effective throughput for all users.

The present inventors have realized, among other things, that automated, accurate, repeatable measurement of the user-perceived rendering performance of a native application on a particular client device can help resolve this difficulty in many ways. For example, application developers may determine whether a recent update to an application has improved or degraded the performance of the application for specific content, such as a web page, set of screens in a flow, or other multimedia document set, which is presented to a user via the client device display. Particular mobile client machines may be found to be surprisingly slower than expected due to minor changes made to an application. At present, only inaccurate manual measurements of such rendering times are known to be available, e.g., via a user with a stop watch.

Embodiments may thus determine the span of time required for particular content to be presented to a user via a particular client machine, and store such performance data along with a timestamp noting when the content was presented. The embodiments may make such measurements repeatedly. A library or database of stored performance test results may include timestamped performance data from any number of client machines which may each comprise a different device type with a particular processor, memory capacity, operating system, and other technical attributes.

Thus, any number of various test devices may be distributed around the world to provide an ongoing substantially real-time measure of native application performance everywhere. Changes in such application performance that may occur for various reasons, such as an application update or restructuring of the presented content, may be rapidly evaluated and analyzed. Distinction of such application performance from network performance may be of particular use to networked publishing and ecommerce sites.

In one example, an embodiment may determine a time span taken to service user requests by converting the client machine display device content into video frames and detecting when changes to those video frames have stopped. The embodiment may store pixel values of individual frames in a matrix, and may compare those pixel values between a first presented frame and a next presented frame, all the way up to the last frame. The embodiment may measure a key frame from the time where there is no change detected between a given frame and the last frame. The user-perceived time needed to fully render a display screen or multimedia document flow thus may be defined as the difference of the time at which the first frame was captured and the time at which the key frame was captured.

In another example, an embodiment may register all service calls made to a backend system or cache, to acquire data such as text and/or images. The embodiment may capture network interactions between a mobile native application and a backend server running in a data center, and then filter the requests that originated from a mobile user interacting with the native application. The embodiment may calculate the number of calls requested to service the mobile user request, and the amount of data requested and received to service the mobile user request. The time required to process the requests may determine a content rendering performance measure.

In another example, an embodiment may use a configuration file to repeat one or more performance capture processes a number of times. The configuration file may detect the presence of a new native application executable, and install it on mobile devices to repeat at least one of the previously described performance capture processes. Such repetition may be periodic, aperiodic, continuous, or schedule-based for example. The embodiment may measure and store the timestamped performance test result along with information describing the application version, the client machine, the network, the operating system, and the rendered content involved. Each such test result may be uniquely identified for future evaluation, and may be communicated to a server in substantially real-time.

In another example, application developers and engineering teams may use the stored performance test results as feedback indicative of application efficiency. Comparisons of performance for different rendered content on a given device may indicate that the application handles particular content type and placement combinations better than others. For example, text may typically be rendered first and images may be rendered later. If a simple change to the organization of a displayed page's content can however reduce the actual overall page rendering time on most client machines, that feedback would be valuable to content designers.

In another example, an embodiment may provide application developers with a visual representation of the captured performance test result data. For example, tables and pie charts may visually contrast changes in performance over time or between different client machines. Additionally, users may be able to select application features that maximize application performance on their particular devices. That is, test results may be gathered for a number of user-selectable application feature combinations and then provided to the user so the user may select the feature combination with the highest content rendering performance.

The embodiment may also perform such application feature selection automatically and/or transparently to the user, so a given application may effectively be "tuned" to work best for a given client machine and content to be displayed. For example, if a back end server provides images quickly but for some reason provides text slowly, the application may elect to render all the images first and render text later when fully available on the client machine.

Similarly, if a change to the application causes performance degradation for a given client machine and/or content to be rendered, an embodiment may forward that change to the particular developer who made the change so it may be corrected. A suite of tests may be deployed to a number of test devices for performance capture and analysis whenever an application update is to be distributed. Problems may thus be discovered on the test devices and corrected before the application update is generally released to users.

The system, method, and computer program product disclosed herein thus may provide faster and more predictable content rendering by a native application for shoppers on networked publishing and ecommerce sites. Accordingly, one or more of the methodologies discussed herein may obviate a need for additional searching or navigation by the user, which may have the technical effect of reducing computing resources used by one or more devices within the system. Examples of such computing resources include, without limitation, processor cycles, network traffic, memory usage, storage space, and power consumption.

In one example, a method for automatically capturing user-perceived content rendering performance by a native application on a user device comprises rendering a first content element in a display device at a start time, repeatedly rendering subsequent content elements and converting the display device content into a succession of video frames, detecting when the display device content stabilizes at a stop time after which a predetermined time span elapses without further content changes, and outputting performance data comprising a rendering duration comprising the stop time minus the start time, wherein a clock in the user device provides the start time and the stop time.

In one example, a non-transitory computer-readable storage medium has embedded therein a set of instructions which, when executed by one or more processors of a computer, causes the computer to execute operations for automatically capturing user-perceived content rendering performance by a native application on a user device, including rendering a first content element in a display device at a start time, repeatedly rendering subsequent content elements and converting the display device content into a succession of video frames, detecting when the display device content stabilizes at a stop time after which a predetermined time span elapses without further content changes, and outputting performance data comprising a rendering duration comprising the stop time minus the start time, wherein a clock in the user device provides the start time and the stop time.

In another example, a system for automatically capturing user-perceived content rendering performance by a native application on a user device may include a processor and a memory that operate to render a first content element in a display device at a start time, repeatedly render subsequent content elements and convert the display device content into a succession of video frames, detect when the display device content stabilizes at a stop time after which a predetermined time span elapses without further content changes, and output performance data comprising a rendering duration comprising the stop time minus the start time, wherein a clock in the user device provides the start time and the stop time.

One example of a distributed network implementing a publication system is illustrated in the network diagram of FIG. 1, which depicts a system 10 using a client-server type architecture. A commerce platform, in the example form of a network-based marketplace platform 12, provides server-side functionality, via a network 14 (e.g., the Internet) to one or more clients. As illustrated, the platform 12 interacts with a web client 16 executing on a client machine 20 and a programmatic client 18 executing on a client machine 22. In one embodiment, web client 16 is a web browser, but it may employ other types of web services.

Turning specifically to the exemplary network-based marketplace platform 12, an Application Program Interface (API) server 24 and a web server 26 are coupled to, and provide programmatic and web interfaces respectively to, one or more application servers 28. The application servers 28 may host one or more marketplace applications 30 and payment applications 32. The application servers 28 are, in turn, shown to be coupled to one or more databases servers 34 that may facilitate access to a number of databases, including an item listing database 35, an image database 36, and an index database 37. The item listing database 35 may store data indicative of item listings for items which are offered for sale or auction on the platform 12.

Each item listing may include, inter alia, a text description of the relevant item and metadata categorizing the item. The image database 36 may include images associated with respective item listings in the item listing database 35. The images in the image database 36 may be standard format image files such as Joint Photographic Expert Group (JPEG) files. The index database 37 may contain index data relating to images in the image database to permit image-based searching of the image database 36.

The marketplace applications 30 may provide a number of marketplace functions and services to users that access the marketplace platform 12. The payment applications 32 likewise may provide a number of payment services and functions to users. The payment applications 32 may allow users to quantify, and accumulate, value (e.g., in a commercial currency, such as the U.S. dollar, or a proprietary currency, such as "points") in accounts, and then to later redeem the accumulated value for products (e.g., goods or services) that are made available via the marketplace applications 30. While the marketplace and payment applications 30 and 32 are shown in FIG. 1 to both form part of the network-based marketplace platform 12, it will be appreciated that, in alternative embodiments, the payment applications 32 may form part of a payment service that is separate and distinct from the marketplace platform 12.

Further, while the system 10 shown in FIG. 1 employs a client-server architecture, the present disclosure is, of course, not limited to such an architecture, and could equally well find application in a distributed, or peer-to-peer, architecture system. The various marketplace and payment applications 30 and 32 could also be implemented as standalone software programs, which do not necessarily have networking capabilities. Additionally, while example embodiments are described with respect to the marketplace platform 12, alternative embodiments may be contemplate use on a publication platform or other non-commerce platforms.

The web client 16, it will be appreciated, may access the various marketplace and payment applications 30 and 32 via the web interface supported by the web server 26. Similarly, the programmatic client 18 may access the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace platform 12 in an off-line manner, and to perform batch-mode communications between the programmatic client 18 and the network-based marketplace platform 12.

FIG. 1 also illustrates a third party application 38, executing on a third party server machine 40, as having programmatic access to the network-based marketplace via the programmatic interface provided by the API server 24. For example, the third party application 38 may, utilizing information retrieved from the network-based marketplace platform 12, support one or more features or functions on a web site hosted by the third party. The third party web site may, for example, provide one or more promotional, marketplace or payment functions that are supported by the relevant applications of the network-based marketplace platform 12.

Figure 2:
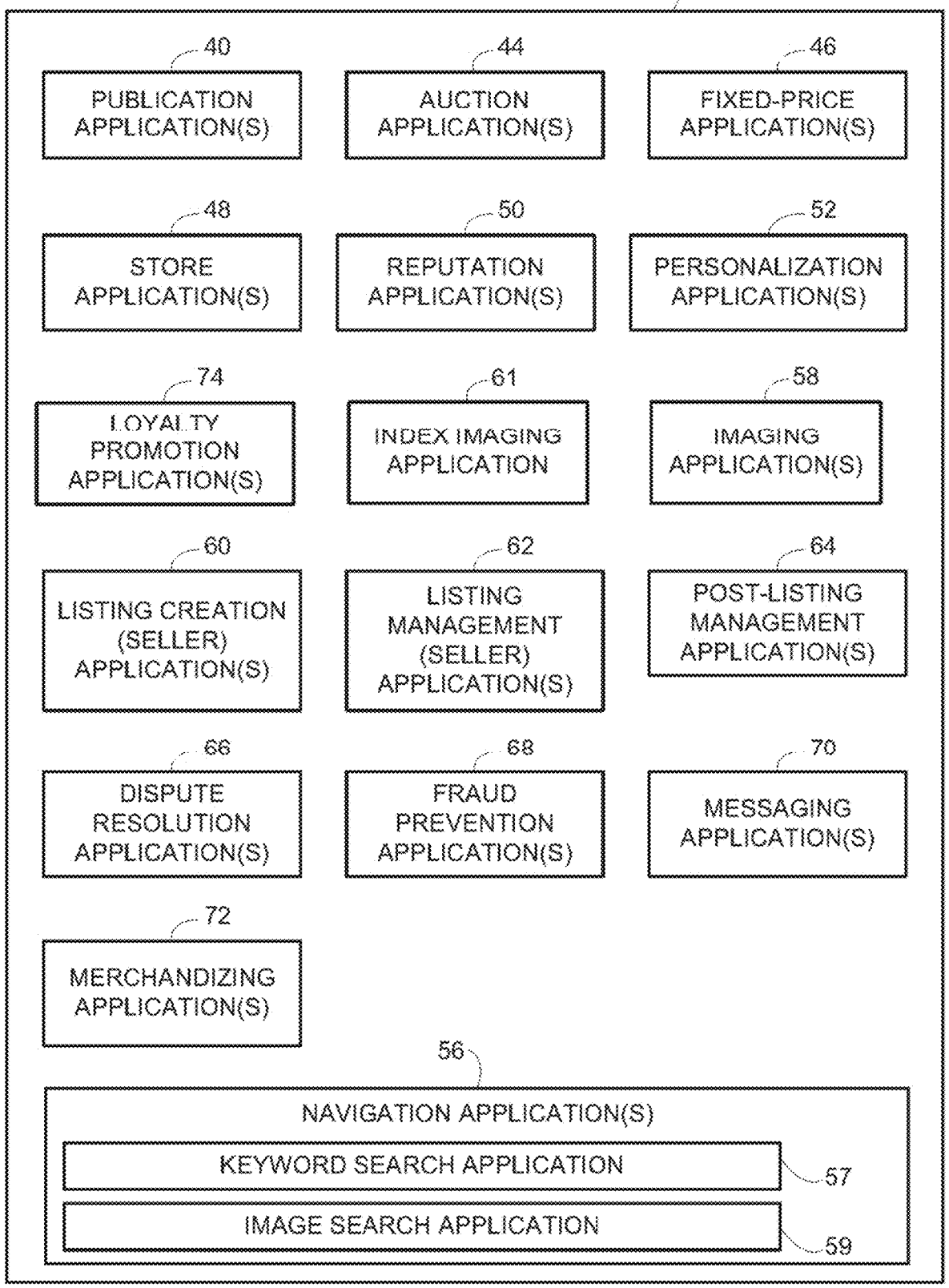
FIG. 2 is a diagrammatic representation of marketplace and payment applications.

FIG. 2 is a block diagram illustrating multiple marketplace and payment applications 30 and 32 that may be provided as part of the network-based marketplace platform 12. The marketplace platform 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include at least one publication application 40 and one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy bidding feature whereby a bidder may invoke automated proxy bidding.

A number of fixed-price applications 46 may support fixed-price listing formats (e.g., the traditional classified advertisement-type listing or a catalogue listing) and buy-out-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives, and features that are specific and personalized to a relevant seller.

Reputation applications 50 allow parties that transact utilizing the network-based marketplace platform 12 to establish, build, and maintain reputations, which may be made available and published to potential trading partners. Consider that where, for example, the network-based marketplace platform 12 supports person-to-person trading, users may have no history or other reference information whereby the trustworthiness and credibility of potential trading partners may be assessed. The reputation application 50 allows a user (for example, through feedback provided by other transaction partners) to establish a reputation within the network-based marketplace platform 12 over time. Other potential trading partners may then reference such a reputation for the purposes of assessing credibility and trustworthiness.

Personalization applications 52 allow users of the marketplace platform 12 to personalize various aspects of their interactions with the marketplace platform 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace and other parties.

In one embodiment, the network-based marketplace platform 12 may support a number of marketplaces that are customized, for example, for specific geographic regions. A version of the marketplace may be customized for the United Kingdom, whereas another version of the marketplace may be customized for the United States. Each of these versions may operate as an independent marketplace, or may be customized (or internationalized) presentations of a common underlying marketplace.

Navigation of the network based-marketplace may be facilitated by one or more navigation applications 56. For example, a keyword search application 57 enables keyword searches of listings published via the marketplace platform 12. Similarly, an image search application 59 enables an image-based search of item listings published via the marketplace platform 12. To perform an image-based search, a user may submit a query image, whereupon the image search application 59 may compare the query image to images in the image database to produce a result list of item listings based on a similarity ranking between the query image and the images associated with the respective item listings. The similarity ranking may be established by parsing or processing the query image to provide index data, and thereafter comparing the query image's index data to pre-compiled index data for the listing images. A browsing application may allow users to browse various category, catalogue, or inventory data structures according to which listings may be classified within the marketplace platform 12. Various other navigation applications may be provided to supplement the search and browsing applications.

In order to make listings available via the network-based marketplace as visually informative and attractive as possible, as well as to enable image-based searching, the marketplace applications 30 may include one or more imaging applications 58, which users may use to upload images for inclusion within listings. Images thus uploaded are stored in the image database 36, with each image being associatively linked to at least one item listing in the item listing database 35. One of the imaging applications 58 may also operate to incorporate images within viewed listings. The imaging applications 58 may also support one or more promotional features, such as image galleries that are presented to potential buyers. For example, sellers may pay an additional fee to have an image included within a gallery of images for promoted items.

The marketplace platform 12 may also include an image indexing application 61 to parse or process images uploaded via the imaging application 58, as well as to parse or process query images submitted via the image search application 59. Index data is the result of processing images by the image indexing application 61 and is stored in the index database 37.

Listing creation applications 60 may allow sellers to conveniently author listings pertaining to goods or services that they wish to transact via the marketplace platform 12, and listing management applications 62 may allow sellers to manage such listings. Specifically, where a particular seller has authored and/or published a large number of listings, the management of such listings may present a challenge. The listing management applications 62 may provide a number of features (e.g., auto-relisting, inventory level monitors, etc.) to assist the seller in managing such listings. One or more post-listing management applications 64 may also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 may provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace. One of the fraud prevention applications 68 may include automatic image comparison, by use of index data produced by the image indexing application 61 and stored in the index database 37. Such image comparison may be used by the fraud prevention application 68 automatically to detect listing images similar to the query image, and to alert a fraud assessor to such image listings, so that the human assessor can examine the identified item listing to determine whether the identified item listing is a fraudulent listing.

Messaging applications 70 may enable the generation and delivery of messages to users of the network-based marketplace platform 12. Such messages may, for example, advise users regarding the status of listings at the marketplace (e.g., providing "outbid" notices to bidders during an auction process or providing promotional and merchandising information to users).

Merchandizing applications 72 may support various merchandizing functions that are made available to sellers to enable sellers to increase sales via the marketplace platform 12. The merchandizing applications 72 also operate the various merchandizing features that may be invoked by sellers and may monitor and track the success of merchandizing strategies employed by sellers.

The present inventors have realized that the marketplace platform 12 described above may be improved if client machines are provided with additional new functionality that enables them to capture performance data relating to content rendering times. For example, a linkage between the performance data available from various client machines and the networked publication and marketing systems of FIGS. 1-2 may prove advantageous to both buyers and sellers, as previously described.

Figure 3:
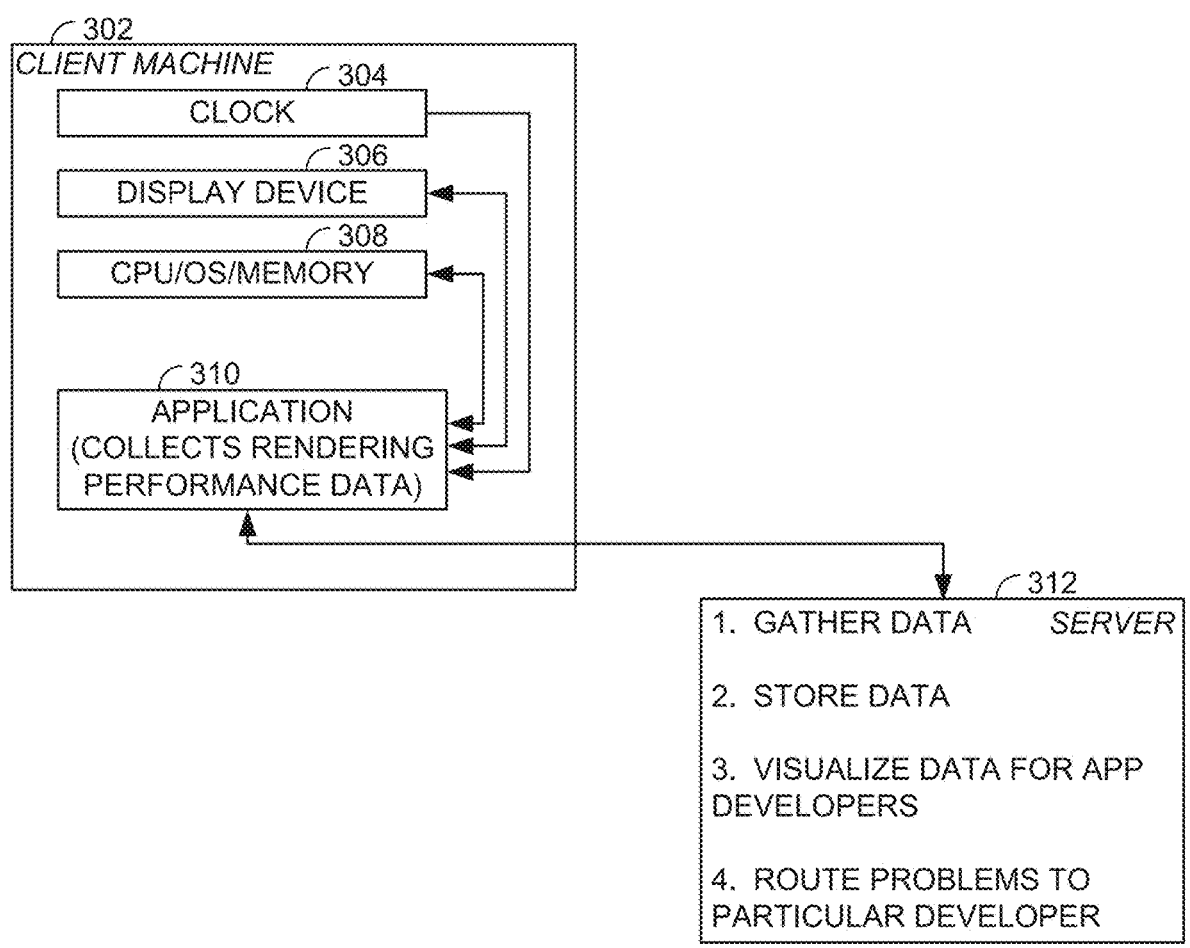
FIG. 3 is a diagrammatic representation of a system for measuring and reporting content rendering performance data, in accordance with a disclosed embodiment.

FIG. 3 is a diagrammatic representation of a system for measuring and reporting content rendering performance data, in accordance with a disclosed embodiment. A client machine 302 may comprise a clock 304, a display device 306, computing hardware and firmware (e.g., a processor, a memory, and an operating system) 308, and an application 310. The client machine 302 may comprise any type of user device, e.g., a laptpop or other personal computer, a smart phone, a tablet, and any other mobile device. The application 310 may comprise a native application, such as an application provided to users of a networked publishing and ecommerce site.

The client machine 302 may be communicatively coupled to a server 312. The server 312 may provide data, such as images and text fields, for the client machine 302 to render on its display device 306 under direction of the application 310. The application 310 may note a start time t_start from the clock 304 corresponding to the beginning of the content rendering processing that the application 310 controls. As the application 310 renders content on the display device 306, it may do so by adding various content elements over a period of time. Typically, text is rendered first, and images are rendered later, but this is not necessarily always the case.

The client machine 302 may note a stop time t_stop from the clock 304 corresponding to the ending of the content rendering processing that the application 310 controls. That is, the stop time t_stop denotes the moment that a user could first perceive that the content has been fully rendered on the display device 306 in its final, highest resolution form. The difference between the stop time t_stop and the start time t_start thus may define the rendering duration, which precisely measures the content rendering performance of the application 310 running on the client machine 302.

One embodiment may determine when the native application content has been fully rendered on the display device 306 by converting display device content to a set of video frames spanning a range of time. Each video frame, which may be a sample of the display device content, maybe stored as an array of pixel values in a matrix. As each new video frame arrives, a comparator may compare its pixel values to the stored pixel values.

Changes in the pixel values may indicate that the display device content is changing, i.e., the process of rendering content in the display is ongoing. In contrast, a lack of changes in the pixel values may either indicate that the content has been fully rendered, or merely that content is still being processed in preparation for display and that the conversion to video frames occurred before rendering was completed. The embodiment may determine that content has been fully rendered by setting a maximum time span that is allowed for displayed content to stabilize. That is, after the maximum time span has elapsed, the embodiment may conclude that the rendering process actually ended when the last pixel value change was observed. In such case, the lapse of the maximum time span was not actually necessary and is therefore not included in the rendering duration, which may be defined as the difference between t_stop and t_start.

Some embodiments may instead perform the video frame comparison by using the structural similarity index (SSIM) image comparison methodology. SSIM is a perception-based model that considers image modification as the perceived change in structural information, i.e., pixels of two similar images need not match precisely but may instead have strong interdependencies, especially when they are spatially close. SSIM operates on average values, variances, and covariances of pixel values, for measurements of luminance, contrast, and structure for pixels in relatively small (e.g., 8×8 pixel) windows of two input images. In some variants, the SSIM methodology operates on separate image samples taken from edges, textures, and smooth image regions.

The SSIM-based approach is more robust than the per-pixel frame comparison approach previously described. First, it does not require a comparison of every pixel in an image pair and is thus far more computationally efficient in terms of both cpu cycles and memory space requirements. Computational efficiency may be particularly important for mobile client devices 302 with limited computing power and memory space. The content rendering performance measurement itself is not intended to significantly alter the actual content rendering performance. Further, the SSIM-based approach may produce a reliable measure of image similarity even when displayed image content shifts position by small amounts (e.g., a few pixels) between frames. Such shifts are unlikely to influence a user's overall perception of rendered image content.

The application 310 may transmit the rendering performance data to the server 312 via a message. The performance data comprises the rendering duration, and may also comprise the content rendered, the number of service calls and the data requested and delivered, a timestamp denoting the date and time at which the content was rendered, as well as detailed information about the client machine 302 gathered by the application 310. The detailed information may include for example the particular cpu/processor model and speed, memory capacity, operating system, and display type and resolution of the client machine 302.

The server 312 may gather the received performance data sent by the client machine 302, and store the performance data in a database. The server 312 may also provide a visual display of the performance data, e.g., for use by application developers. Application developers may be very interested in determining the content rendering performance of various client machines, as well as changes in performance due to application updates.

The server 312 may also route detected changes, such as reductions, in content rendering performance to a particular developer to alert the developer of performance issues. The server may select a particular developer based on whether that developer made changes to the application that caused the performance change, or whether that developer has been assigned to investigate performance variations, for example.

Figure 4A:
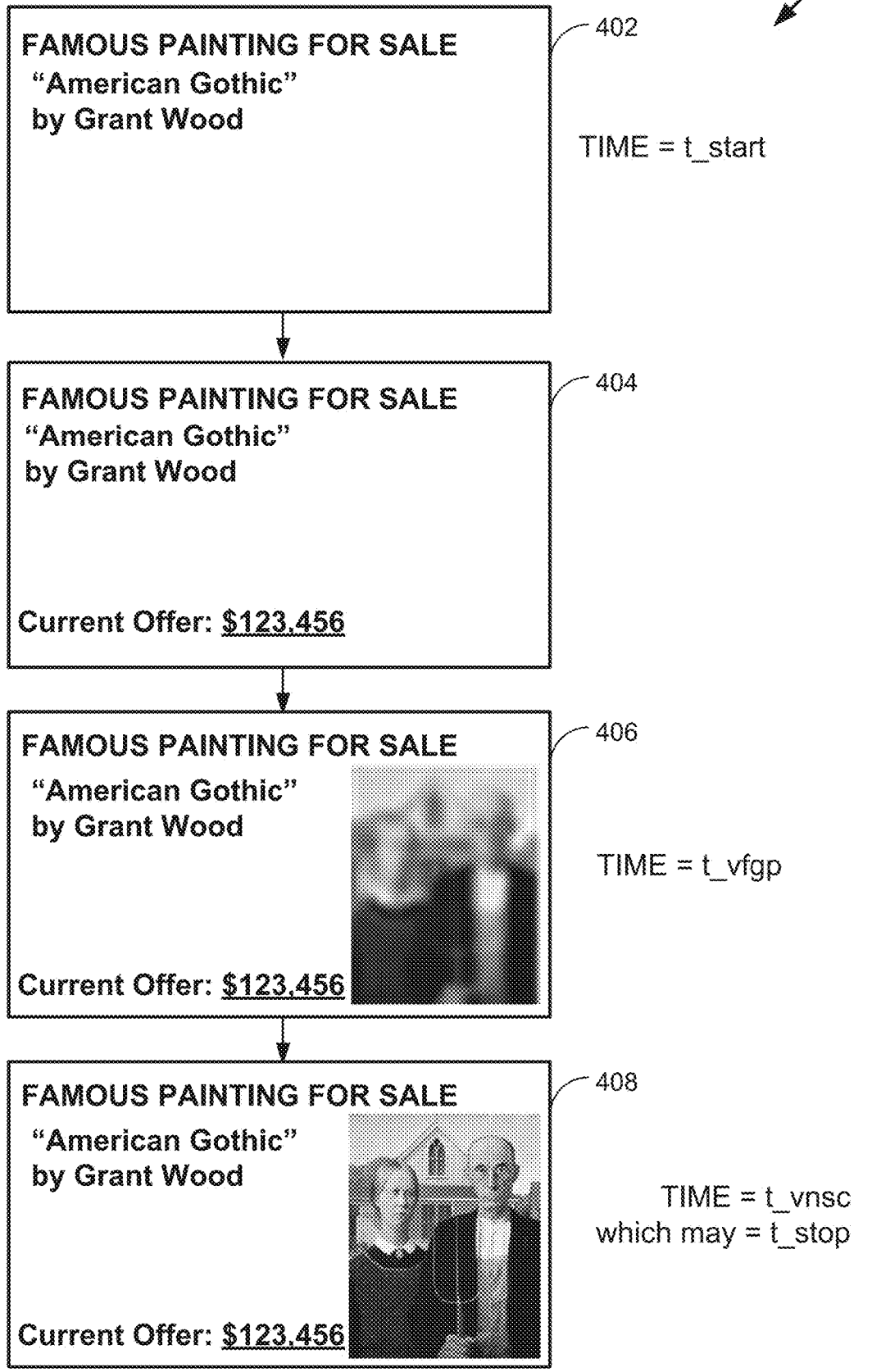
FIG. 4A is a diagrammatic representation of a display in which content is rendered, in accordance with a disclosed embodiment.

FIG. 4A is a diagrammatic representation of a display in which content is rendered, in accordance with a disclosed embodiment. In this example, the content to be displayed in the display device 306 includes two text elements and an image. The rendering may begin at time t_start, provided by the clock 304, with the application 310 blanking any previously displayed content and depicting text display content 402. "FAMOUS PAINTING FOR SALE 'American Gothic' by Grant Wood" in the display device 306 of the client machine 302 for a user, for example.

At some time thereafter, the application 310 may update the text display content 402 to include variable data describing the current item offer price, for example, as shown added in the updated display content 404. The application 310 may then add an image of the item for sale to form the final display content 406. The initial version of the image rendered may be a low resolution version. The time at which the low resolution images are rendered may be defined as t_vfgp, to be described. Low resolution images may typically be replaced by high resolution images thereafter. The time at which the high resolution images are rendered may be defined as t_vnsc, to be described. Rendering of the final display content 408 may finish at time t_stop, with the value of t_stop provided by the clock 304. The rendering duration may thus be defined as t_stop minus t_start, as previously described. The lower this value, the higher the performance of the client machine 302.

Embodiments may sample the displayed content and convert it to video frames as previously described. In one embodiment, the video frames may be sampled at a rate that determines the precision with which rendering performance may be measured. Content rendering time measurements with a precision of several milliseconds may be sufficient, for example. Another embodiment may determine a more precise timing measure if the clock 304 actually counts client machine 302 processor cycles.

Further embodiments may determine the performance data according to different methodologies. The viewer may for example, in one embodiment, be deemed to actually begin to perceive the rendered content at a "virtual first glance perception" time t_vfgp, which may be the point in time during the rendering that all text and low resolution versions of all images may have first been rendered, as shown in image 406 for example. Text is typically rendered first, followed by low resolution versions of images, although this is not necessarily always the case. High resolution versions of images may finally replace the low resolution versions of images thereafter, either one at a time or simultaneously.

In one embodiment, t_vfgp may be determined by converting rendered frames like 402, 404, and 406 into grayscale values, and determining that the low resolution versions of the images have all been fully rendered when the grayscale values of the rendered page stop changing significantly. That is, a blank screen may have grayscale values that change notably when text is presented, and then again when low resolution versions of each of the images are rendered. However, the process of replacing the low resolution versions of the images with high resolution versions of the images may typically cause far less significant changes in grayscale values, because the grayscale values of low resolution images are often very similar to the grayscale values of the corresponding high resolution images. If the goal is to measure the performance as would be estimated by a user, and the user may first glance at rendered content when the low resolution images are all rendered, the time t_vfgp may therefore be a more relevant effective rendering beginning time than the actual beginning time t_start.

In another embodiment, the time at which the user perceives the virtual next significant change, designated t_vnsc, may correspond to the time when all of the high resolution versions of the images have been rendered. Time t_vnsc may be very close to or equal to the time t_stop, but the disclosure is not so limited. The time t_vnsc may differ from the time t_stop in some instances, such as where the rendered page contains further, less significant content changes that continue to be rendered than the rendering of high resolution images.

For example, as an advertisement loads, previously rendered content may be slightly repositioned on a page. Likewise, lower priority items, typically small indicia of some active rendering continuing, may take a few moments after t_vnsc to disappear from the final rendered document. In some cases, dynamic content, such as advertisements, may never become fully static. If the goal is again to measure the performance as would be estimated by a user, and the user may ignore ongoing small changes, the time t_vnsc may be a more relevant effective rendering ending time than the actual ending time t_stop.

In one embodiment, the performance data is based on t_vnsc minus t_vfgp. It is possible that if no low resolution versions of images are rendered at all that t_vnsc will be equal to t_vfgp, though this is atypical for most auction applications and should probably not form the basis of performance data for such applications. In another embodiment, the performance data representing the rendering duration is based on fitting a linear model of the percentage of content rendered between t_vfgp and t_vnsc to determine a projected t_stop. In another embodiment, the performance data is based on fitting nonlinear model, such as a hyperbola, of the percentage of content rendered between t_vfgp and t_vnsc to determine an approximate projected t_stop. This embodiment may be particularly effective whenever there is a pattern of ongoing minor pixel changes that prevent a fully static end point from being reached. In such an embodiment, the projected t_stop estimate may be approximated based on a fixed time estimate granularity, such as thirty milliseconds.

In one embodiment, if an estimate of t_stop cannot be made because rendering progress is incomplete and comes to a halt, due for example to a failed network connection, the rendering duration may be assigned a predetermined error value or negative value. This value may indicate that performance has failed entirely, for example if no content changes at all have occurred for a predetermined time, such as ten seconds. Such an outcome that may trigger a major error flag and various network diagnostic actions to restore connectivity.

In another embodiment, t_stop may be determined by an examination of network traffic to determine when the next script unrelated to the rendering begins. For example, in an online auction scenario, a search page may transition to a rendering of search results, which may then be followed by another script when the rendering finishes. The beginning of the subsequent unrelated script may thus define t_stop.

Figure 4B:
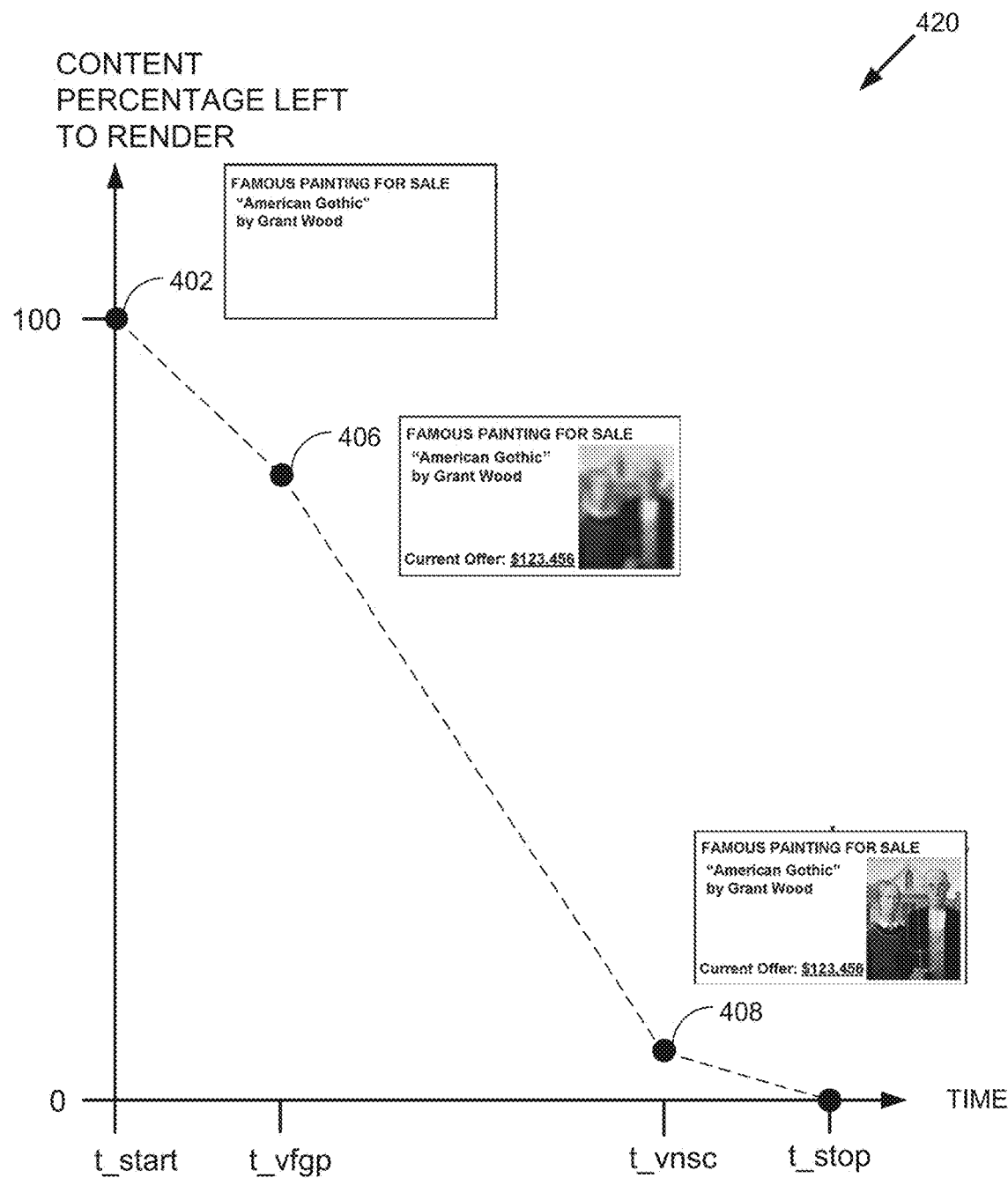
FIG. 4B is a diagrammatic representation of the content percentage left to be rendered versus time, in accordance with a disclosed embodiment.

FIG. 4B is a diagrammatic representation 420 of the content percentage left to be rendered versus time, in accordance with a disclosed embodiment. At time t_start, all of the content remains to be rendered, with static text typically rendered first as shown previously in image 402. At time t_vfgp, the remaining text and low resolution images have been rendered; this time is often the actual time when a typical user begins paying attention to a display, as the placement of the low resolution images may substantially set the placement of rendered items on the page. At time t_vnsc, the low resolution images may have been replaced with rendered high resolution images. A typical user may re-evaluate the rendered content at this point, by for example carefully viewing the high resolution images after having read the previously rendered text. At time t_stop, all content has been rendered on the display, and further unrelated computing tasks may begin. Note that t_vnsc may often equal to t_stop, or nearly equal t_stop, but the disclosure is not limited to this situation, as it is possible that minor content of low interest to a typical user may continue to be rendered after the high resolution images have been rendered.

Figure 5:
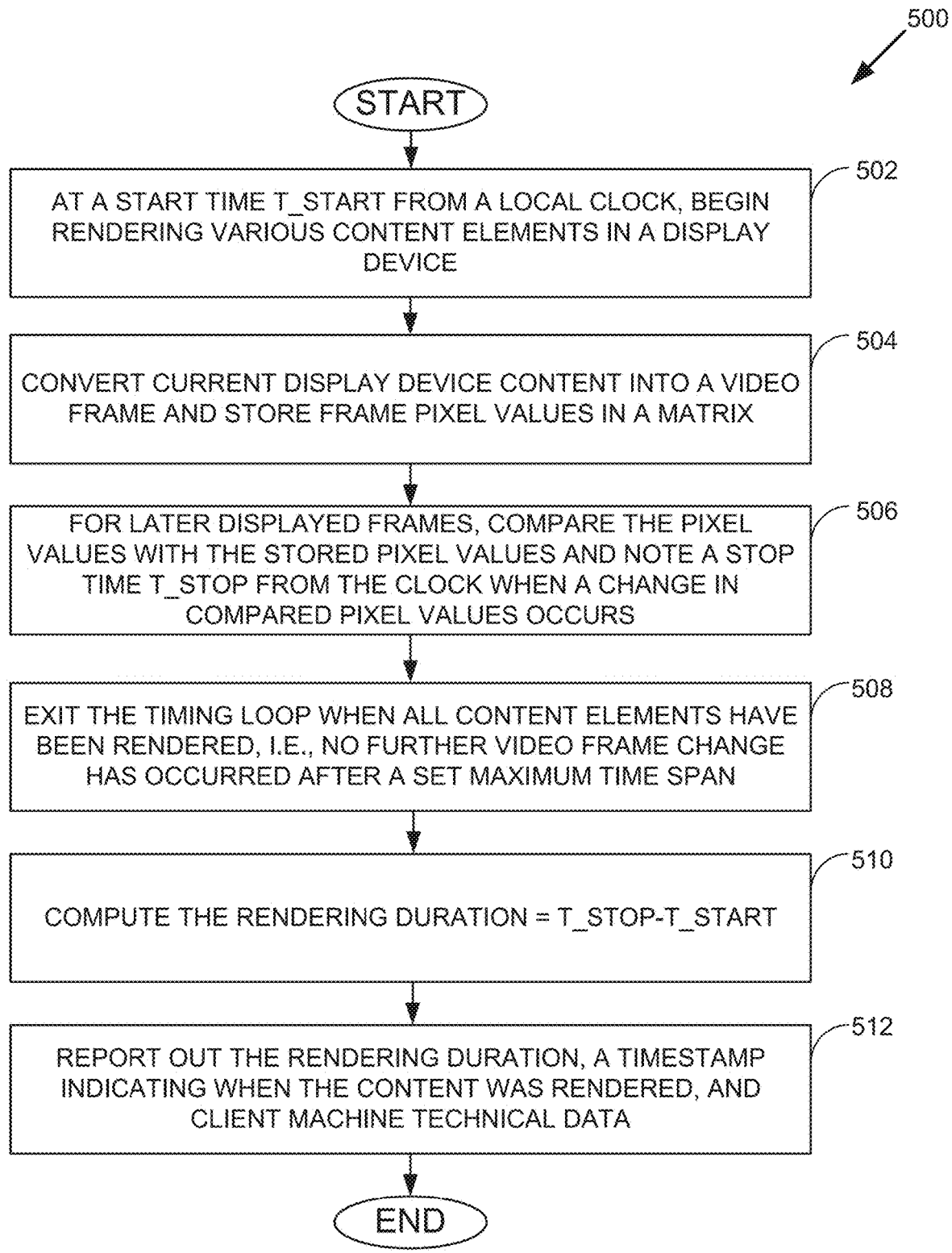
FIG. 5 is a flow chart illustrating a method for capturing content rendering performance data, in accordance with a disclosed embodiment.

FIG. 5 is a flow chart 500 illustrating a method for capturing content rendering performance data, in accordance with a disclosed embodiment. The method generally follows the operation of the system described above, and may be implemented as a set of program instructions that are stored in a computer-readable medium and executed by at least one processor.

At 502, the method may note start time t_start from the clock 304 and begin the process of rendering content elements in the display device 306. The rendering process may comprise execution of instructions by a processor to copy data from a memory into the display device 306 for example. At 504, the method may convert the currently displayed content into a video frame. The method may store video frame pixel values in a matrix, for example in a memory of the client machine 302.

At 506, the method may process subsequently displayed video frames to determine when all elements of the content have been completely rendered in the display device 306. Each significant content change that occurs between a given video frame and its successor frame indicates that the rendering process is ongoing. In one embodiment, a stop time value of t_stop may be repeatedly updated as each frame is processed.

At 508, the method may exit the video comparison and timing loop when all of the content elements have been rendered in the display device 306. Such a determination is complicated by the fact that two video frames may be substantially identical either because the rendering process has completed or because the two video frames were sampled while the client machine 302 was busy processing content (e.g., loading a large image from memory, during which time multiple video frames were sampled) but had not yet folly finished the content rendering process. Therefore, in one embodiment, the sampling process continues for some predetermined maximum time span after the video frame changes have ended and the value of t_stop is no longer updated.

That is, if the video frame content changes end and the maximum time span has elapsed with no further significant changes between video frames, the embodiment has very certainly determined that all content has been rendered. If however a video frame change occurs before the maximum time span has elapsed (e.g., if a large image has finally been transferred from memory to the display device 306, during which time multiple video frames were sampled), the value of t_stop may be updated, the maximum time span may be reset, and the video frame sampling and comparison process may be continued.

At 510, the method may compute the rendering duration as the difference between t_stop and t_start. In another embodiment, the method may compute the rendering duration based on t_vfgp and t_vnsc. Thus, the rendering duration accurately reflects the user's experience regarding the actual beginning and ending times of the presentation of content in the display device 306. At 512, the method may tangibly report out the rendering duration and thus the content rendering performance. Other data may be provided as well, including a timestamp indicating when the content was rendered, along with detailed technical information about client machine 302 (e.g., its device type, processor, memory capacity, and operating system) gathered by the application. A copy of the actual rendered content and the related service call information may also be provided. The reported data may also be accompanied by a unique identifier, to assist with its logging and subsequent analysis.

The method may transmit the collected performance data and other data in a message to a number of communicatively coupled servers 312, in essentially real-time in some cases. Although this description is written in terms of the servers 312 performing the analysis of the performance data, in some embodiments the client machines 302 may perform these tasks, in some instances in addition to or instead of the servers 312. As previously noted, the method may operate repeatedly, e.g., essentially continuously, periodically, or only sporadically (depending perhaps on the capabilities of the client machine 302 and/or the network bandwidth available). The method may also operate as directed by a server 312, for example in response to a configuration file that may handle native application updating. The method may also operate without notifying the user, so the user is not distracted by the performance monitoring. In other cases, the method may operate on command from a user.

Figure 6:
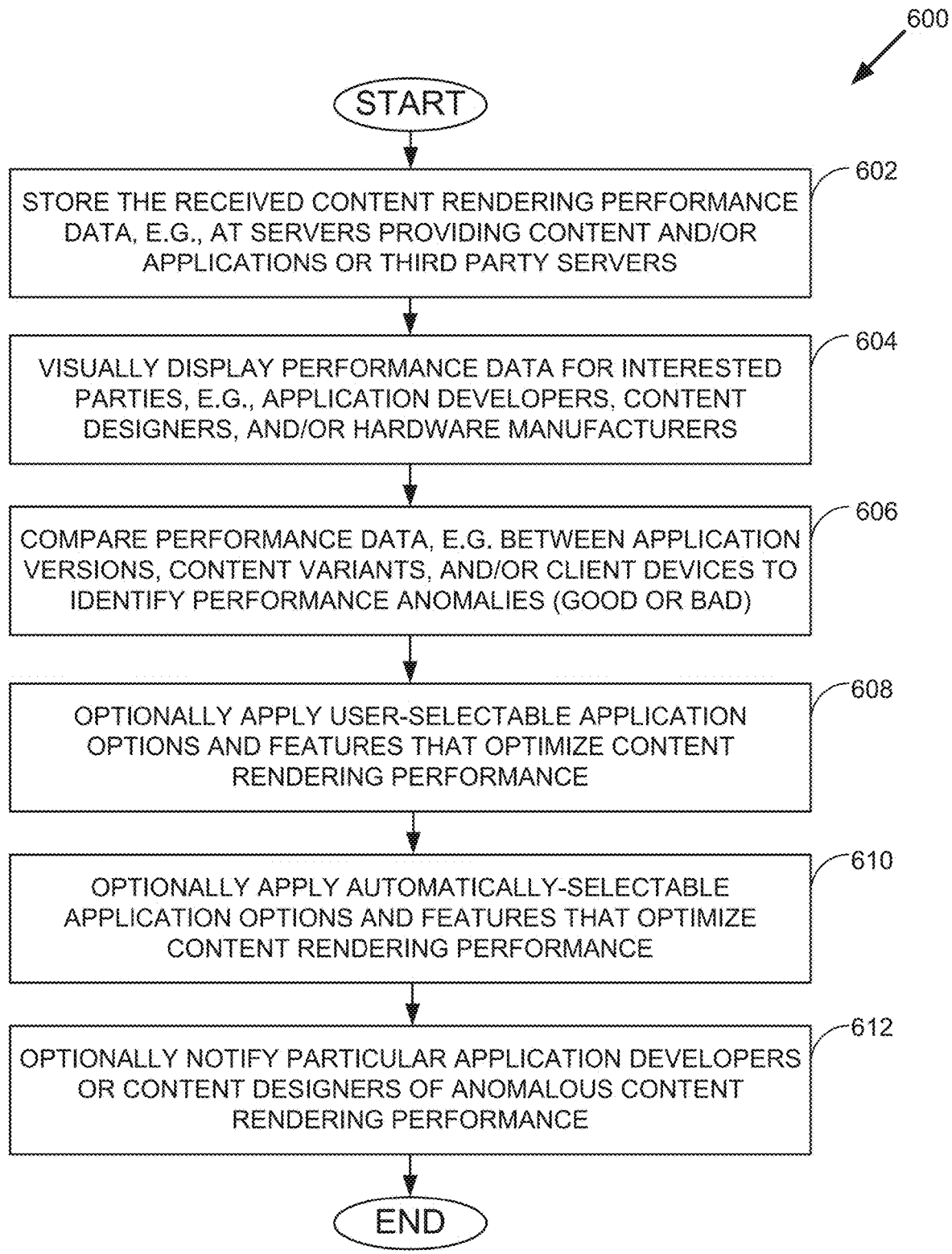
FIG. 6 is a flow chart illustrating a method for processing captured content rendering performance data, according to an embodiment.

FIG. 6 is a flow chart 600 illustrating a method for processing captured content rendering performance data, according to an embodiment. At 602, the method may store the received content rendering performance data in an archive or database. Typically, at least one server 312 may store the received data, for subsequent retrieval and analysis. Servers 312 may comprise servers operated by content providers, application developers, or third parties who may be called on to provide independent evaluations or reviews for example.

At 604, the method may display the stored data, for example to visually highlight changes in content rendering performance to application developers and engineering teams who wish to evaluate the performance of the application 310 running on the computing hardware and firmware 308. Developers may provide a suite of content rendering performance tests to be provided to various client machines 302. Hardware manufacturers may likewise be interested in performance measures, for example to tout superior performance for users of an application that renders content well when executed on their machinery.

At 606, the method may compare results of these tests for both an initial application version and an updated application version, automatically or manually, to identify performance discrepancies between versions. Similarly, test results may show that the organization of a display document's content may have a notable impact on content rendering performance for a given application version. Thus, both application developers and content designers may benefit from the availability of test data provided by various client machines 302. That is, the worst case scenario of both content and application changes causing drastic performance reductions on a particular client device 302 may be detected, diagnosed, and remedied at once.

At 608, the method may optionally apply user-selectable options and features that maximize application 310 content rendering performance on particular client devices 302. For example, the user may determine through use of the method that content rendering performance is best when all text items are rendered before any image items. In another example, the user may select options in the application 310 allowing small images to be rendered simultaneously with text if that setting is optimal. The user may also control client device 302 hardware or operating system settings that speed up content rendering as determined by the method.

At 610, the method may optionally select application 310 features or settings automatically, to maximize content rendering performance. In one embodiment, the method may look up application 310 features or settings according to the technical specifications of the particular client machine 302 running the application 310. The data guiding selection of the features or settings may be provided by a server 312 that has previously determined optimal values based on testing. Such servers 312 may be those of an application developer, content provider, and/or hardware manufacturer. In another embodiment, the method may base the automatic selection of application 310 features on the results of content rendering performance tests.

At 612, the method may provide notice to a particular responsible application developer or content designer responsible for changes to an application or content item, respectively. For example, if an application developer modified a portion of code that has degraded (or increased) content rendering performance for an application update, debugging information may identify the faulty (or improved) function. The application developer's development tools may then act on the identification to route the flagged issue to a particular engineer or programmer. Similarly, versions of content found to cause anomalous rendering performance may trigger alerts to a particular content designer.

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of some of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations thereof. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or some other suitable configuration. Further, these three tiers may be distributed between more than one computer systems as various components.

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various APIs), and may be compiled into one complete server, client, and/or peer software application. Further, these APIs may be able to communicate through various distributed programming protocols as distributed computing components.

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

Example embodiments may use the Open Systems interconnection (OSI) model or Transfer Control Protocol/Internet Protocol (TCP/IP) protocol stack model for defining the protocols used by a network to transmit data. In applying these models, a system of data transmission between a server and client, or between peer computer systems, may, for example, include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally Asynchronous Transfer Mode (ATM), Systems Network Architecture (SNA), Serial Digital Interface (SDI), or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the embodiment. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Figure 7:
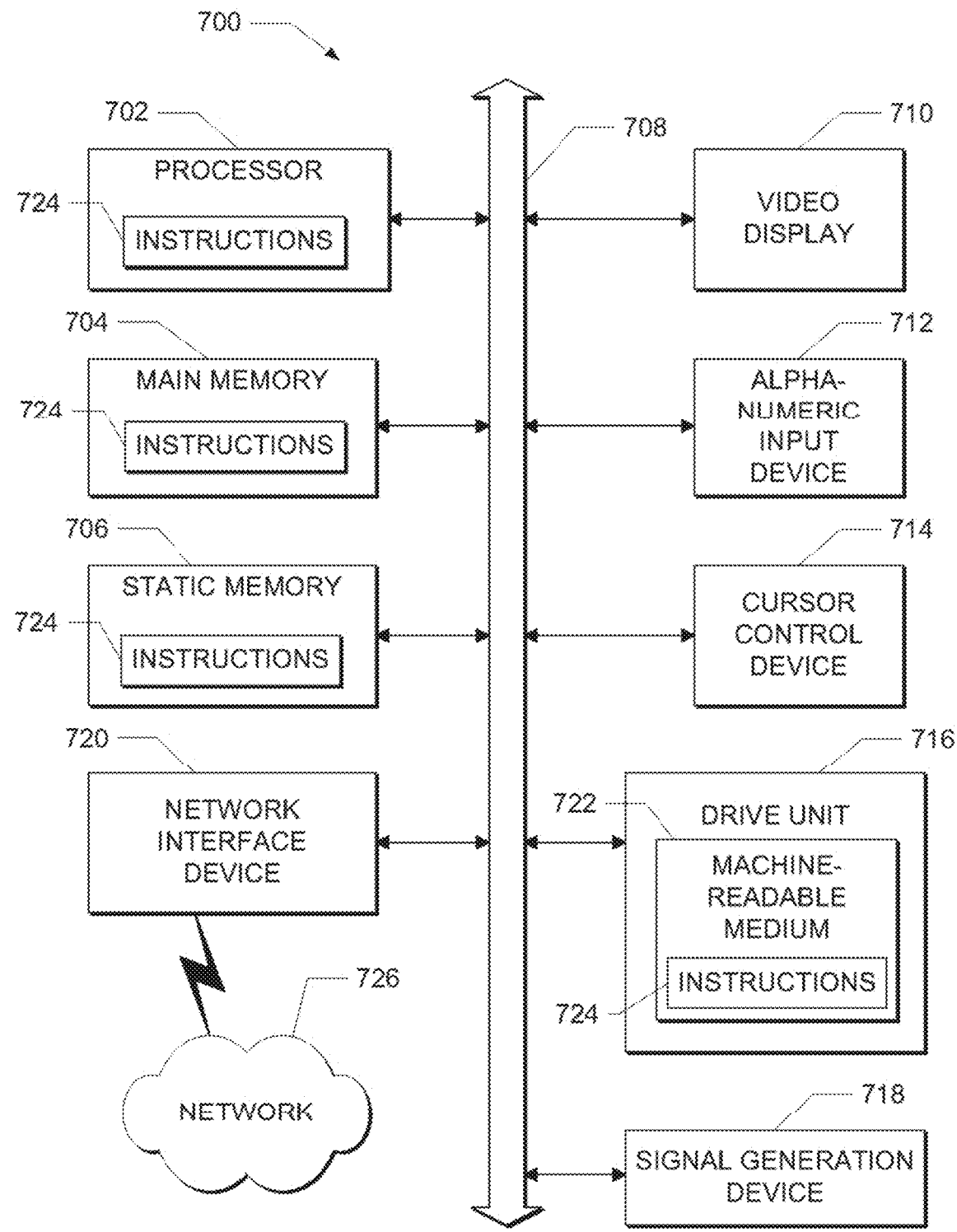
FIG. 7 is a block diagram of a machine in the example form of a computer system within which a set of instructions for causing the machine to perform any one or more of the methodologies discussed herein, may be executed.

FIG. 7 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., CPU, a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker), and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the static memory 706, the main memory 704, and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, and optical and magnetic media.

Figure 8:
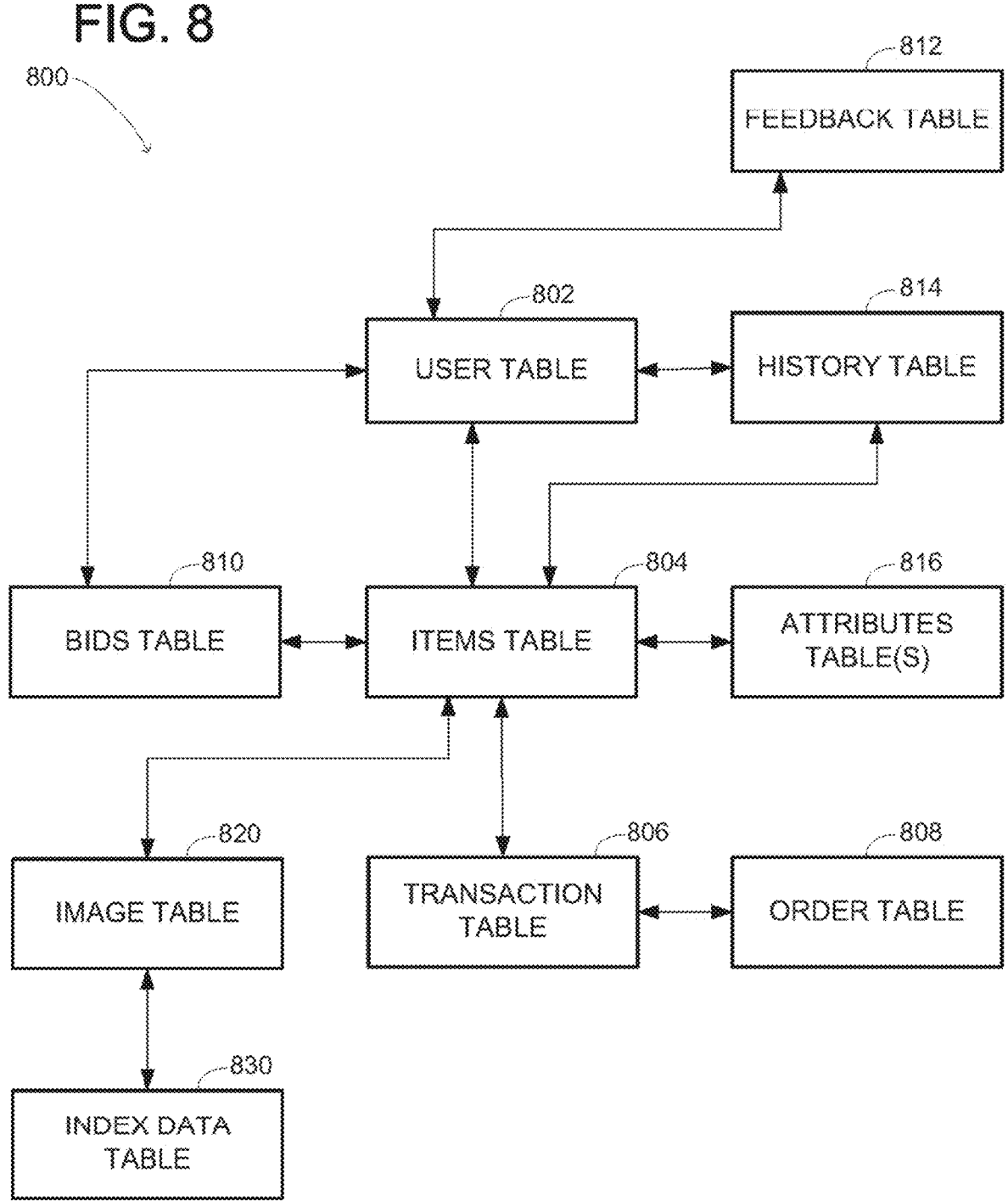
FIG. 8 is a diagrammatic view of a data structure, according to an example embodiment of a network-based marketplace.

FIG. 8 is a high-level entity-relationship diagram of an example embodiment, illustrating various tables 800 that may be maintained within the databases 35 to 37, and that are utilized by and support the applications 30 and 32. A user table 802 contains a record for each registered user of the network-based marketplace platform 12, and may include identifier, address, and financial instrument information pertaining to each such registered user. A user may operate as a seller, a buyer, or both, within the network-based marketplace platform 12. In one example embodiment, a buyer may be a user that has accumulated value (e.g., commercial or proprietary currency), and is accordingly able to exchange the accumulated value for items that are offered for sale by the network-based marketplace platform 12. The user table 802 may also contain sensor data for a user.

The tables 800 also include an items table 804 in which are maintained item records for goods and services that are available to be, or have been, transacted via the network-based marketplace platform 12. Each item record within the items table 804 may furthermore be linked to one or more user records within the user table 802, so as to associate a seller and one or more actual or potential buyers with each item record.

The items table 804 may be connected to an image table 820, which contains images associated with the respective items or item listings in the items table 804. The image table 820 is in turn connected to an index data table 830, which contains index data as described in detail above.

A transaction table 806 contains a record for each transaction (e.g., a purchase or sale transaction) pertaining to items for which records exist within the items table 804. The transaction table 806 may also contain recommendations that have been provided to the user based on physical activity determined from sensor data and on products purchased by other similar users.

An order table 808 is populated with order records, with each order record being associated with an order. Each order, in turn, may correspond to one or more transactions for which records exist within the transaction table 806. The order table 808 may also contain indications of whether an order was based on a recommendation provided based on sensor data.

Bid records within a bids table 810 each relate to a bid received at the network-based marketplace platform 12 in connection with an auction-format listing supported by an auction application 32. A feedback table 812 is utilized by one or more reputation applications 50, in one example embodiment, to construct and maintain reputation information concerning users. A history table 814 maintains a history of transactions to which a user has been a party. One or more attributes tables 816 record attribute information pertaining to items for which records exist within the items table 804. Considering only a single example of such an attribute, the attributes tables 816 may indicate a currency attribute associated with a particular item, with the currency attribute identifying the currency of a price for the relevant item as specified by a seller.

Thus, a method and system to provide captured content rendering performance test results in a network-based marketplace have been described. Although the present method and system have been described with reference to specific example embodiments, it will be evident that various modifications and changes may be made to these embodiments without departing from the broader spirit and scope of the application. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for automatically capturing user-perceived content rendering performance by a native application on a user device, the method comprising:
   rendering a first content element in a display device at a start time;
   repeatedly rendering subsequent content elements and converting the display device content into a succession of video frames;
   detecting when the display device content stabilizes at a stop time after which a predetermined time span elapses without further content changes; and
   outputting performance data comprising a rendering duration comprising the stop time minus the start time,
   wherein a clock in the user device provides the start time and the stop time.

2. The method of claim 1, wherein the native application enables use of a networked publication and ecommerce system.

3. The method of claim 1, wherein the user device is a mobile device comprising at least one of a smart phone, a laptop computer, and a tablet.

4. The method of claim 1, wherein the content element comprises at least one of a text field and an image.

5. The method of claim 1, wherein the start time is based on when successive video frame grayscale content stabilizes.

6. The method of claim 1, wherein the stop time is estimated from one of: when all maximum resolution images are rendered, when a model estimates all content will be rendered, and when a subsequent unrelated script begins.

7. The method of claim 1, further comprising assigning the rendering duration to one of a predetermined error value and a negative value, if rendering progress is incomplete and comes to a halt.

8. The method of claim 1, further comprising outputting at least one of a timestamp indicating when the content was rendered, and technical information describing the user device.

9. The method of claim 1, further comprising storing and visually displaying the performance data, and detecting performance anomalies.

10. The method of claim 9, further comprising notifying at least one of an application developer and a content designer of the performance anomalies.

11. A non-transitory computer-readable storage medium having embedded therein a set of instructions which, when executed by one or more processors of a computer, causes the computer to execute the following operations for automatically capturing user-perceived content rendering performance by a native application on a user device:
rendering a first content element in a display device at a start time;
repeatedly rendering subsequent content elements and converting the display device content into a succession of video frames;
detecting when the display device content stabilizes at a stop time after which a predetermined time span elapses without further content changes; and
outputting performance data comprising a rendering duration comprising the stop time minus the start time,
wherein a clock in the user device provides the start time and the stop time.

12. The medium of claim 11, wherein the user device is a mobile device comprising at least one of a smart phone, a laptop computer, and a tablet.

13. The medium of claim 11, wherein the content element comprises at least one of a text field and an image.

14. The medium of claim 11, wherein the start time is based on when successive video frame grayscale content stabilizes.

15. The medium of claim 11, wherein the stop time is estimated from one of: when all maximum resolution images are rendered, when a model estimates all content will be rendered, and when a subsequent unrelated script begins.

16. The medium of claim 11, further comprising instructions causing assigning the rendering duration to one of a predetermined error value and a negative value, if rendering progress is incomplete and comes to a halt.

17. The medium of claim 11, further comprising instructions causing outputting of at least one of a timestamp indicating when the content was rendered, and technical information describing the user device.

18. The medium of claim 11, further comprising instructions causing storing and visually displaying of the performance data, and detecting of performance anomalies.

19. The medium of claim 18, further comprising instructions causing notifying of at least one of an application developer and a content designer of the performance anomalies.

20. A system for automatically capturing user-perceived content rendering performance by a native application on a user device, the system comprising:
a processor and a memory that operate to:
render a first content element in a display device at a start time;
repeatedly render subsequent content elements and convert the display device content into a succession of video frames;
detect when the display device content stabilizes at a stop time after which a predetermined time span elapses without further content changes; and
output performance data comprising a rendering duration comprising the stop time minus the start time, wherein a clock in the user device provides the start time and the stop time.

* * * * *